United States Patent
Zheng et al.

(10) Patent No.: US 6,909,066 B2
(45) Date of Patent: Jun. 21, 2005

(54) ADAPTIVE AND SYNERGIC FILL WELDING METHOD AND APPARATUS

(75) Inventors: Bing Zheng, Columbus, OH (US); Dennis Duane Harwig, Powell, OH (US); Ta-Chieh Huang, Hilliard, OH (US); Constance Theresa Reichert, Columbus, OH (US)

(73) Assignee: Edison Welding Institute, Columbus, OH (US)

( * ) Notice: Subject to any disclaimer, the term of this patent is extended or adjusted under 35 U.S.C. 154(b) by 155 days.

(21) Appl. No.: 10/630,475

(22) Filed: Jul. 30, 2003

(65) Prior Publication Data

US 2005/0023261 A1 Feb. 3, 2005

(51) Int. Cl.[7] .................................................. B23K 9/12
(52) U.S. Cl. ............................. 219/130.5; 219/124.34; 219/125.1
(58) Field of Search ...................... 219/124.34, 125.1, 219/125.11, 125.12, 130.5

(56) References Cited

U.S. PATENT DOCUMENTS

| | | | |
|---|---|---|---|
| 4,394,559 A | 7/1983 | Nomura et al. | |
| 4,477,713 A | 10/1984 | Cook et al. | |
| 4,493,968 A | 1/1985 | Brown | |
| 4,608,481 A | 8/1986 | Nomura et al. | |
| 4,621,185 A | 11/1986 | Brown | |
| 4,647,753 A | 3/1987 | Nakashima et al. | |
| 4,728,774 A | 3/1988 | Hayakawa | |
| 4,883,938 A | * 11/1989 | Sarugaku | 219/124.34 |
| 5,206,474 A | * 4/1993 | Fukuoka et al. | 219/124.34 |
| 5,532,452 A | 7/1996 | Lechner et al. | |
| 5,932,123 A | 8/1999 | Marhofer et al. | |
| 6,011,241 A | * 1/2000 | Rongo | 219/124.34 |
| 6,096,994 A | * 8/2000 | Handa et al. | 219/130.5 |
| 6,155,475 A | 12/2000 | Ekeloff et al. | |
| 6,362,456 B1 | 3/2002 | Ludewig et al. | |

* cited by examiner

*Primary Examiner*—Clifford C. Shaw
(74) *Attorney, Agent, or Firm*—Gallagher & Dawsey Co., L.P.A.; Michael J. Gallagher; David J. Dawsey

(57) ABSTRACT

An adaptive and synergic fill welding method and apparatus enables automatic, or adaptive fill, and user directed, or synergic fill, modes to provide improved fusion quality, by ensuring that base metal dilution of a weld remains within a predetermined range. The apparatus includes a means for profiling and tracking a joint, and multi-part adjustable welding means. In adaptive fill mode the method automatically varies a plurality of welding parameters in response to measured variations such as joint width between work pieces. In synergic fill mode, the method enables a user to vary multiple welding parameters in response to joint variations by adjusting a single variable, a synergic fill number, which may be controlled by means of a user interface pendent. The multiple welding parameters may include predetermined wire feed speed, torch travel speed, welding voltage and current, torch oscillation width, dwell time, and a plurality of bead size parameters.

30 Claims, 7 Drawing Sheets

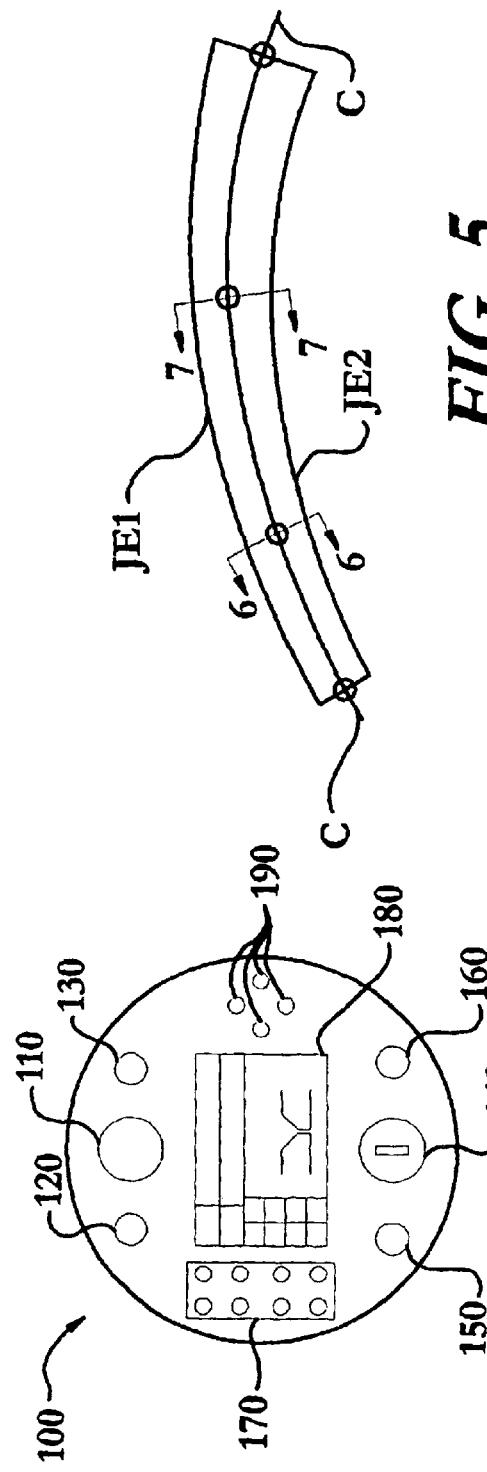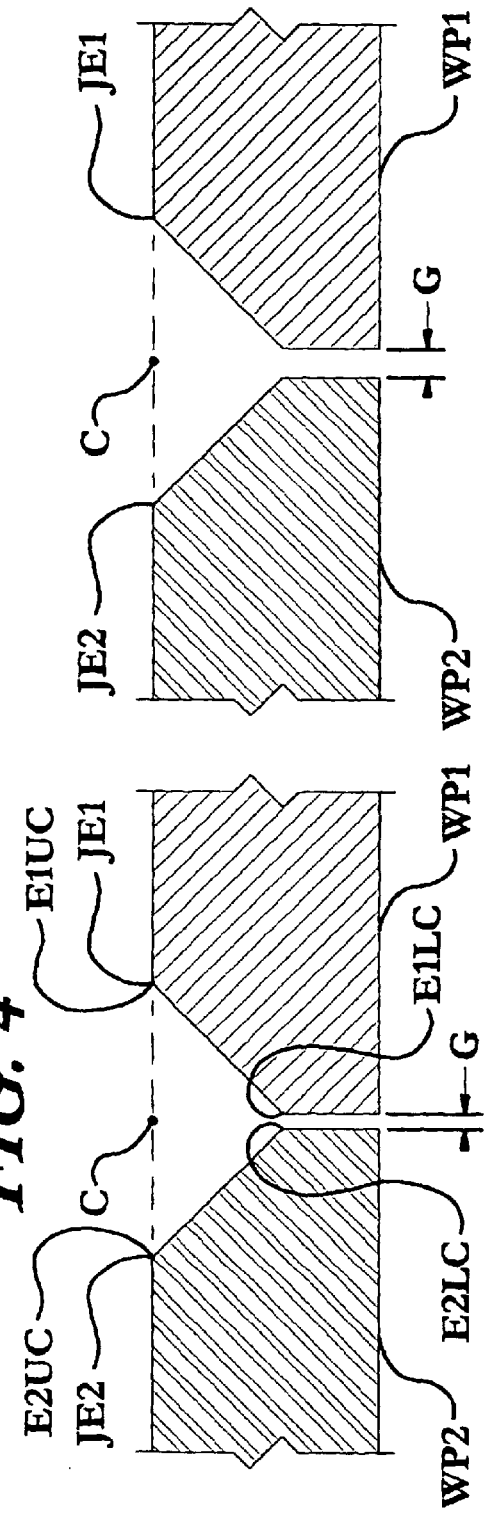

ADAPTIVE AND SYNERGIC FILL WELDING METHOD AND APPARATUS

STATEMENT REGARDING FEDERALLY SPONSORED RESEARCH OR DEVELOPMENT

This invention was made with government support under Contract No. N00140-96-C-0188 awarded by the Office of Naval Research, United States Department of the Navy. The government has certain rights in the invention.

TECHNICAL FIELD

The present invention relates to the field of material joining; particularly, to an adaptive and synergic fill welding method and apparatus that produces high quality welds having a predetermined base metal dilution.

BACKGROUND OF THE INVENTION

Numerous industries have long sought to reduce the amount of labor necessary to join various work pieces by welding, while increasing the quality of the joints. In fact, automated welding systems have greatly improved weld quality while reducing costs in many industries. However, to date, very few automated welding systems have effectively dealt with weld joints having continuously variable characteristics.

The effects of weld joints with great variability is most commonly felt in industries that join large sections of material, such as the automobile, aviation, heavy manufacturing, and shipbuilding industries, among others. For example, in the shipbuilding industry, a major limitation on the productivity of a shipyard is the erection of the ship from units. Most shipyards have effective systems for welding longitudinal and transverse members to panels in production. These panels are then fitted into units, which are then welded together to create super-units. The cost of erection welding the units and super-units is often more than five times the cost of production welding the panels due in part to the extensive labor required for fit-up of the units. Generally the edges of one unit do not match directly with the edges of an adjoining unit. Fit-up issues most commonly arise due to distortions and the accumulation of fabrication tolerances causing variable gaps and mismatch along the weld seams.

Continuing with the shipbuilding example, erection welding is most commonly completed by manual flux-cored arc welding (FCAW), gas-metal arc welding (GMAW), or submerged arc-welding (SAW). Mechanized tractors are used as much as possible, especially on long weld seams. Generally each weld seam requires multiple weld passes with each pass adding a weld bead to the seam. Currently, systems are limited in the quality of the welds produced and in the amount of adverse fit-up conditions that may be overcome in trying to produce a uniform groove fill. In fact, most shipyards still use tractor systems that require the operator to closely follow the tractor and make physical adjustments, in an attempt to achieve a uniform fill.

More advanced robotic tractors have been developed to track weld seams and perform some degree of adaptive welding, yet they are generally too costly and heavy to employ in shipyard fabrication and provide little if any control on the quality of the welds produced. For instance, laser-guided welding robots have been developed for erection welding, but such systems typically cost over $150,000 and require significant operator training and programming. Such systems are only justified on the most critical weldments, particularly where 100% UT volumetric inspection is required.

Prior adaptive welding methods have lacked the ability to ensure weld quality in part because they generally focus on only varying one of the wire feed speed, the voltage, or the travel speed of the welding tractor. Weld quality cannot be assured by varying only one of these variables. The present invention may systematically vary the voltage, the wire feed speed, and the travel speed along with a plurality of experimentally optimized welding parameters. The experimentally optimized welding parameters are developed from experimentally determined process relationships developed to result in a predetermined base metal dilution and weld bead shape. By ensuring that the adaptive welding method results in base metal dilution in a predetermined range, an increased level of weld quality is obtained.

Additionally, prior art systems have lacked the ability to allow a user to easily change numerous complex welding parameters at the same time, with a single input to influence the weld bead size, while maintaining the weld quality during the welding process. The present invention utilizes the concept of changing a single synergic fill number to thereby influence a plurality of optimized parameters, to not only maximize the use of optimized welding parameters but to also avoid the manual, individual adjustments, of a multitude of complex welding parameters by the user to vary the size of the weld bead.

Accordingly, the art has needed a means for providing a durable, cost effective automated adaptive and synergic fill welding system that offers robust seam tracking, weld quality control, and production optimization. While some of the prior art devices attempted to improve the state of the art, none have achieved the benefits of the present invention. Additionally, the prior art has generally not provided the level of quality control available from the present invention. Further, the prior art has failed to achieve the unique and novel configurations and capabilities of the present invention. With these capabilities taken into consideration, the instant invention addresses many of the shortcomings of the prior art and offers significant benefits heretofore unavailable. Lastly, none of the above inventions and patents, taken either singly or in combination, is seen to describe the instant invention as claimed.

SUMMARY OF INVENTION

In its most general configuration, the present invention advances the state of the art with a variety of new capabilities and overcomes many of the shortcomings of prior methods in new and novel ways. In its most general sense, the present invention overcomes the shortcomings and limitations of the prior art in any of a number of generally effective configurations. An object of the invention is to provide a low cost adaptive and synergic fill welding method and apparatus that produces welded joints having improved weld quality and allows real-time intervention by an operator during welding to easily influence a number of complex welding parameters. The instant invention demonstrates such capabilities and overcomes many of the shortcomings of prior methods in new and novel ways.

The adaptive and synergic fill welding apparatus is particularly suited for the joining of work pieces along a joint having a variable joint profile. The apparatus generally includes a means for profiling and tracking the joint, a means for welding the joint, a means for feeding a consumable electrode to the welding means, a means for controlling the power to the welding means, a means for adjusting the location of the profiling and tracking means and the welding means, a means for adjusting the rotation of the welding means, a means for moving multiple elements of the apparatus, a portable means for user input and display, a means for controlling various elements of the apparatus, and a means for communicating a plurality of input and output commands, and power among the various means of this apparatus. These means work in conjunction to provide improved fusion quality, in part by ensuring that the base metal dilution of a weld remains within a predetermined range.

The profiling and tracking means is a portion of a larger assembly known as the head assembly. The head assembly may include the profiling and tracking means, the welding means, the adjusting means, and the rotation means, all of which may be mounted on a structural member, or beam.

The profiling and tracking means includes the joint profile and tracking system. The joint profile and tracking system acquires information about a joint where a plurality of work pieces intersect. In one particular embodiment, the joint profile and tracking system identifies the location of a first and a second joint edge, as well as associated X, Y, and Z coordinates of a lower corner and an upper corner for each joint edge. The joint profile and tracking system may further identify the center of the joint, as well as the distance that the system is away from a surface of one of the work pieces. Such information may be acquired in any number of ways. One particular embodiment includes a laser sensor system consisting of a laser and a camera in a single housing, and may further include a semi-conductor laser and a complimentary metal oxide semiconductor (CMOS) type camera. One with skill in the art will appreciate that many other forms of joint profiling and tracking may be used. Further, the profiling and tracking means may incorporate off the shelf systems or may incorporate custom configured systems designed to minimize the size of the overall apparatus.

In a typical configuration, the joint profile and tracking system leads the welding torch in the direction of travel by a predetermined lead distance thereby acquiring information about an upcoming section of the joint. A joint profile and tracking system position adjuster may be introduced to improve the flexibility with which the joint profile and tracking system leads the welding means, or welding torch, thereby adjusting the lead distance. Various applications, and welding speeds, may require the joint profile and tracking system to lead the welding means by varying lead distances.

The information acquired by the joint profiling and tracking system allows the controlling means to have the welding means track along a joint automatically. Further, the profiling and tracking system acquires the data that permits the apparatus to automatically change the size of a weld bead relative to changes in a weld layer to account for changes in the joint profile.

The welding torch may also be attached to the beam, most commonly through the rotation means, or pendulum. The pendulum, in association with the control system, acts to control the trajectory of the welding torch and to oscillate the torch to obtain the desired weld bead size.

In addition to the joint profile and tracking system position adjuster, the adjusting means of the apparatus generally also includes a torch height adjuster, as the height of the welding torch above the work piece is critical to the success of the apparatus. The torch height may be predetermined, or it may be continuously variable as determined by the joint profile and tracking system. The torch height adjuster may be used to trim the length of the arc by moving the welding torch in the Z-axis.

Further, the adjusting means may include a transverse beam adjuster to join the beam to the welding tractor system and to position the head assembly transversely along the joint, in the direction of the X-axis. As with the other aspects of the adjusting means, the transverse beam adjuster may be manual or fully automated. The transverse beam adjuster is most commonly used to position the welding torch and joint profile and tracking system within a joint.

As one with skill in the art will appreciate, the welding means may include a flux-cored arc welding torch, a gasmetal arc welding torch, or a submerged arc welding torch, among others. In one embodiment, a flux-cored arc welding torch is utilized to receive a consumable electrode wire and receive power from the power controlling means to create an arc, having predetermined characteristics, between the electrode wire and one of the work pieces. The power controlling means generally consists of an electric welding power source adapted to convert incoming alternating current constant voltage power to alternating or direct current variable voltage power for distribution to the welding torch.

The moving means may incorporate a welding tractor system. The moving means is adapted to cooperate with the longitudinal motion system to ensure precise controlled motion of several components of the apparatus along the joint. In one of many potential embodiments, the longitudinal motion system includes at least one rail and at least one rail attachment. The at least one rail attachment may include virtually any conventional attachment device, however attachments that are easily attached and removed, such as vacuum pads, are often preferred. Similarly, the at least one rail may incorporate any number of features to ensure accurate positioning of the elements that translate upon the rail. Generally, the at least one rail is designed to cooperate with elements of the moving means, namely a welding tractor system, and the wire feeding means, namely a wire feed system.

One embodiment of the welding tractor system includes a tractor system carriage designed to travel on at least one rail. Similarly, one embodiment of the wire feeding means includes a wire feed system carriage designed travel on the at least one rail. While in this particular embodiment the welding tractor system and the wire feed system are separate components, these systems could be combined in a single component. The rail may include a toothed recess in which a pinion from the tractor system carriage and/or the wire feed system carriage cooperates so as to impart controlled unidirectional motion upon the welding tractor system and the wire feed system. In yet another alternate embodiment, the tractor system carriage may pull the wire feed system carriage via a carriage inter-connector.

In yet another embodiment, the welding tractor system may include a welding tractor, a motion drive, a tractor adaptor, and the previously described tractor system carriage. The welding tractor and the motion drive work together to accurately power the welding tractor system along the longitudinal motion system. The tractor adaptor may serve to demodulate and/or condition various control signals transmitted about the apparatus.

In a further embodiment, the wire feed system may include a wire spool, a wire feed adaptor, a wire feeder, and the previously described wire feed system carriage. The wire spool houses and dispenses the electrode wire. The wire feed adaptor may serve to demodulate and/or condition various control signals transmitted about the apparatus and the wire feeder may act to control the speed with which the electrode wire is dispensed from the wire spool. In some embodiments, the electrode wire may be fed from the wire spool to the welding torch within a wire feed cable. The wire feed cable may also serve to electrically connect the wire feed system and the welding torch and some embodiments may utilize the wire feed cable to transmit the welding power to the welding torch.

As one with skill in the art will appreciate, while the previous description of the various potential embodiments of the longitudinal motion system are directed toward large scale applications wherein the longitudinal motion system is attached to stationary work pieces, the apparatus of the present invention may incorporate a longitudinal motion system wherein the work pieces are fed to the various elements of the apparatus.

The apparatus also includes a portable means for user input and display, also referred to as a user interface pendent. The user interface pendent is a durable lightweight device that may be carried by the user overseeing the operation of the apparatus and may be hardwired to communicate with the various components of the apparatus, or it may be wireless. It may include a plurality of input and output devices adapted to control various aspects of the apparatus. One particular embodiment of the pendent includes a synergic fill regulation device and a welding voltage regulation device, both allowing the user to influence the automatic welding of the apparatus while it is welding; an emergency stop button.

In one embodiment, the welding voltage regulation device is a resistance-based knob permitting the user to change the welding voltage by a predetermined amount to maintain a constant arc length during the welding process. A user may need to adjust the welding voltage to account for power transmission losses over long cables from the welding power source, and in one preferred embodiment, the user may utilize the welding voltage regulation device to change the welding voltage by +/−2 volts.

The controlling means controls at least the welding means, the location adjusting means, the rotation means, the electrode means, the moving means, and the power controlling means based upon input from the profiling and tracking means and the user input and display means, to obtain a weld of a predetermined base metal dilution. The controlling means may incorporate a number of predetermined welding modes, for example, the controlling means may include an adaptive fill mode, a synergic fill mode, and a manual mode.

The controlling means includes at least one system controller. The system controller may include any number of attached sub-controllers, such as a joint profile and tracking system controller and a welding source adaptor, to communicate with various components of the apparatus. Sub-controllers are common when self-contained, or proprietary, components are introduced into the apparatus. The welding source adaptor may serve to demodulate and/or condition various control signals transmitted about the apparatus. The system controller may be configured to communicate with auxiliary input and display devices such as conventional monitors, keyboards, and mice.

When operating in the adaptive fill mode, the apparatus may adaptively change the predetermined weld bead size, with no external intervention, to compensate for changes in a weld joint layer width as a result of changes in the joint profile, commonly encountered when joining multiple work pieces. A common fit-up problem occurs when the gap between the first work piece and the second work piece is variable throughout the length of the joint. Therefore, if the joint is to be filled with five layers of welds, the apparatus must be capable of sensing the increase in layer width and making adjustments to the weld bead size to ensure that the particular number of weld passes completely fills the layer, while not reducing the quality of the weld.

The controlling means accomplishes this in a new and novel method implemented in a new and novel apparatus, and with new and novel software. In one particular embodiment this new and novel method is implemented by system software having a plurality of modules. One with skill in the art will appreciate that this is just one illustrative embodiment, and that many alternative software architectures may be utilized to incorporate the method of the present invention. This particular embodiment includes the following modules; process database, motion, welding, tracking, synergic and adaptive fill, profile sensing, user interface, communication, and data exchange. These modules are integrated together based on the system requirements of initialization, configuration, setup, jog, dry run, and welding.

In general, the process database module of the present embodiment hosts all of the information necessary to implement the targeted welding process. The motion module of the present embodiment implements the required control of the four axes of the present embodiment, namely the longitudinal axis (X-direction), the transverse axis (Y-direction), the torch height axis (Z-direction), and the torch trajectory oscillation plane (P-direction). The welding module of the present embodiment includes an enable/disable sub-control module for the welding power source, the wire feed system, and a gas solenoid valve for use when utilizing shielding gas. Further, the tracking module of the present embodiment is responsible for making the position adjustment to the welding torch based upon joint profile information captured by the joint profile and tracking system.

The synergic and adaptive fill module of the present embodiment allows the user to select a synergic fill number as a base number prior to welding, and to enable/disable synergic or adaptive fill welding operations. The synergic fill number represents a ratio of the predetermined wire feed speed to the predetermined travel speed. Therefore, the synergic fill number represents the size of a weld bead and in this module acts as an index to an array of grouped optimized welding parameters that are based upon experimental data. The experimental data is collected using a systematic parameter development method, invented by the present inventors, that develops relationships between the arc length, productivity, and quality for a given application (i.e., fixed weld size). Process functional relationships are then determined by plotting voltage versus current, voltage versus wire feed speed, current versus wire feed speed, and heat input versus productivity, or deposition rate. Base metal dilution between the deposit and the base material is then used to assess fusion quality. Experimentation showed that base metal dilution in the range of approximately 30% to approximately 70% resulted in welds of high quality. Higher base metal dilution can promote higher quality welds but may limit the process capability for out-of-position welding. Therefore, in one exemplary embodiment, the optimized welding parameters were experimentally acquired having a goal of obtaining a base metal dilution between approximately 40% and approximately 50%. The range of base metal dilution used to acquire the experimentally optimized parameters may be customized for each particular application.

In the present embodiment, arrays of grouped optimized welding parameters exist for a plurality of welding pass categories; namely a root pass, a fill pass, and a cap pass(named for their deposited layer positions in the joint), and a plurality of synergic fill numbers. The optimized welding parameters include a predetermined wire feed speed, a predetermined travel speed, a welding voltage, a welding current, an oscillation width, at least one dwell time for the welding means, and a plurality of bead size parameters. The plurality of bead size parameters may include a bead width, a bead depth, at least one leg length, and at least one leg toe angle. Prior adaptive welding methods have lacked the ability to ensure weld quality in part because they generally focus on only varying one of the wire feed speed, the voltage, or the travel speed. The present invention systematically varies the voltage, the wire feed speed, and the travel speed based upon the process relationships that result in a predetermined base metal dilution and weld bead shape.

While the adaptive fill mode is fully automated and does not permit user influence, the synergic fill mode permits the user to influence the welding operation during welding. The synergic fill regulation device, on the pendent, allows the user to influence the automatic welding of the apparatus. More specifically, the synergic fill regulation device permits the user to change the synergic fill number. Consequently, the size of the weld bead may be systematically set and varied with the application of different synergic fill numbers. Therefore, the concept of changing the synergic fill number and thereby changing a plurality of optimized parameters, herein referred to as synergic fill welding, not only maximizes the use of optimized welding parameters but also avoids the manual individual adjustments of a multitude of welding parameters by a user to vary the size of the weld bead having no control on the weld quality. Additionally, a manual mode provides the operator the option of controlling all of the welding parameters from the single location of the user interface pendent. This option of single point manual control provides the operator with great flexibility and convenience.

Referring back to the various software modules, the joint profile module of the instant embodiment constantly communicates with the base system software residing in the joint profile and tracking system via an RS-422 serial port to exchange data and commands. In this particular, embodiment the base software is responsible for setting up specific joint characteristics such as the joint type, base metal preparations, and certain sensor characteristics like image acquisition rate. One with skill in the art will appreciate that this module, and for that matter any module herein, may reside virtually anywhere in the apparatus, and is not limited to residing in the joint profile and tracking system. This module accesses the joint profile and tracking system to gather and process information about the joint geometry, derive tracking data, calculate the area and area change of an unfilled joint groove, turns the joint profile and tracking system on and off and accepts position data of the welding torch. The user interface module of the instant embodiment may be embedded to the user interface pendent for interacting with the user via any of the user interface devices. Further, the module may translate and dispatch commands issued by the user via an RS-422 serial port after analysis of the status of the various user interface devices of the pendent. The communication module of the instant embodiment is implemented between the system controller and the pendent, and between the system controller and the joint profile and tracking system controller, via two RS-422 serial ports in order to achieve fast and reliable data exchange. The communication of the system software with the pendent is activated by channel build-up software, which is developed using multithreads approach to meet the requirement of random talking.

The data exchange module of the instant invention responds to the command set issued from the pendent, forwards the joint profile data from the joint profile and tracking system to the pendent, feeds back the torch position data to the joint profile and tracking system controller, and applies the synergic and adaptive fill strategy.

Further, the system software of the instant embodiment embodies a coordination module that manages the events occurring inside the system. This module ranks the priorities of the requested actions, routes the command set to dedicated command handlers for execution, and monitors and processes the requests originated from the pendent and the joint profile and tracking system controller.

Lastly, the apparatus includes a means for communicating a plurality of input and output commands, and power among the various means of this apparatus, illustrated herein as a power/communication system. As previously described, the input and output commands, as well as other monitoring data, may be transmitted via RS-422 serial ports to achieve fast and reliable data exchange, or by wireless data transfer methods as are contemplated.

These variations, modifications, alternatives, and alterations of the various preferred embodiments, processes, and methods may be used alone or in combination with one another, as will become more readily apparent to those with skill in the art with reference to the following detailed description of the preferred embodiments and the accompanying figures and drawings.

BRIEF DESCRIPTION OF THE DRAWINGS

Without limiting the scope of the present invention as claimed below and referring now to the drawings and figures:

FIG. 4 shows a top plan view of the user interface pendent of the present invention, not to scale;

FIG. 5 shows a top plan view of a joint between two work pieces, not to scale;

FIG. 6 shows a cross-sectional view, not to scale, of the joint of FIG. 5 taken along section line 6—6;

FIG. 7 shows a cross-sectional view, not to scale, of the joint of FIG. 5 taken along section line 7—7;

DETAILED DESCRIPTION OF THE INVENTION

The adaptive and synergic fill welding apparatus of the present invention enables a significant advance in the state of the art. The preferred embodiments of the apparatus accomplish this by new and novel arrangements of elements and methods that are configured in unique and novel ways and which demonstrate previously unavailable but preferred and desirable capabilities. In particular, the apparatus is a low-cost, easy to use, device that provides a significant advance in the quality and control of adaptive and synergic welding systems. The detailed description set forth below in connection with the drawings is intended merely as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention.

Figure 3:
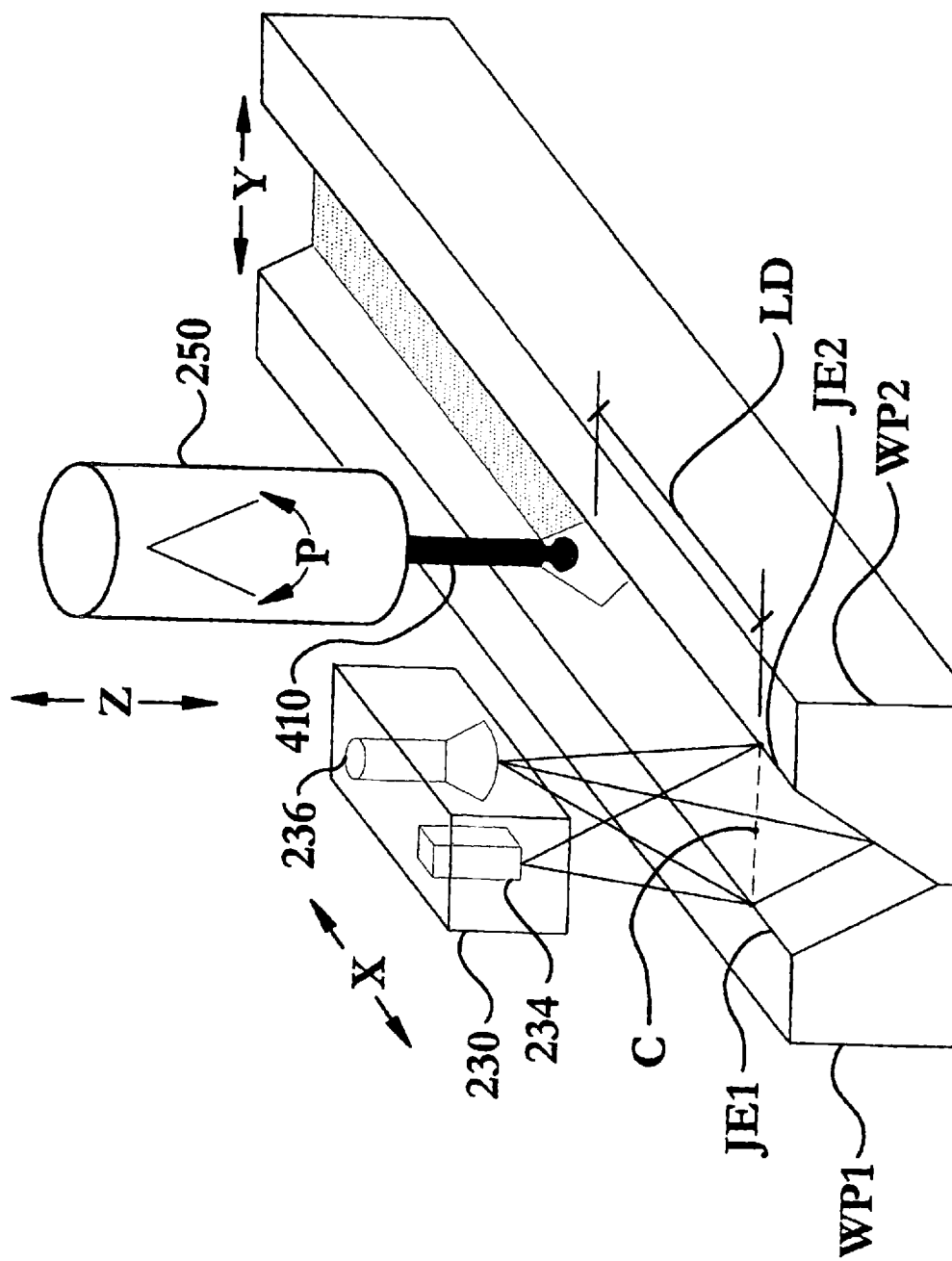
FIG. 3 shows an elevated perspective view of a portion of the present invention, not to scale.

The adaptive and synergic fill welding apparatus 50 of the present invention advances the art of materials joining, and is particularly suited for joining at least a first work piece WP1 and a second work WP2 piece along a joint J having a variable joint profile, illustrated in FIG. 3. The apparatus 50 generally includes a means for profiling and tracking the joint J, a means for welding the joint J, a means for feeding a consumable electrode to the welding means, a means for controlling the power to the welding means, a means for adjusting the location of the profiling and tracking means and the welding means, a means for adjusting the rotation of the welding means, a means for moving multiple elements of the apparatus, a portable means for user input and display, a means for controlling various elements of the apparatus, and a means for communicating a plurality of input and output commands, and power among the various means of this apparatus. These means work in conjunction to provide improved fusion quality, in part by ensuring that the base metal dilution of a weld remains within a predetermined range.

Figure 1:
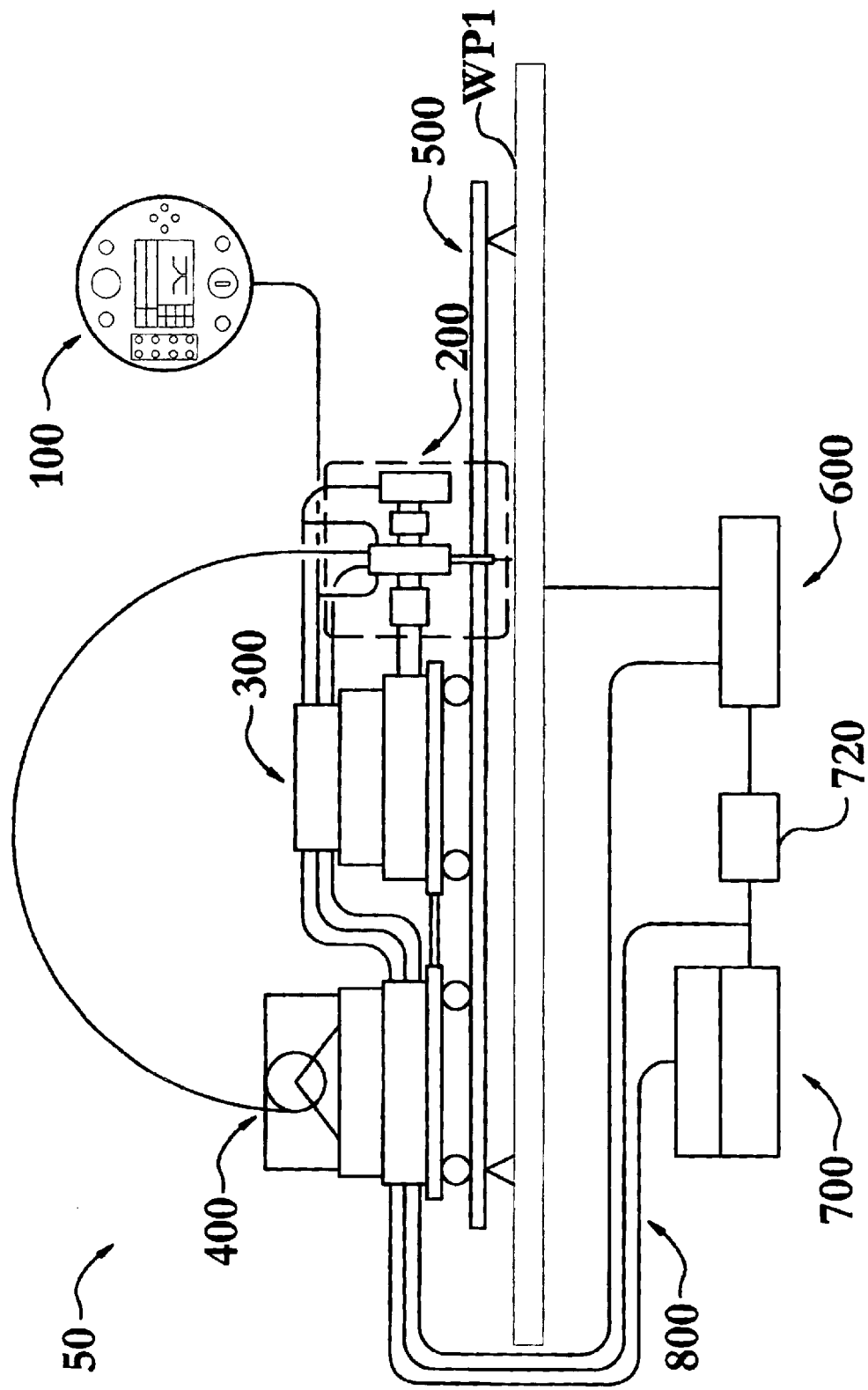
FIG. 1 shows a schematic of one embodiment of the present invention, not to scale.

The profiling and tracking means is a portion of a larger assembly known as the head assembly 200, as seen in FIG. 1. The head assembly 200 may include the profiling and tracking means, the welding means, the adjusting means, and the rotation means, all of which may be adjustably and releasably mounted on a structural member, or beam 210, as seen in FIG. 2.

Figure 2:
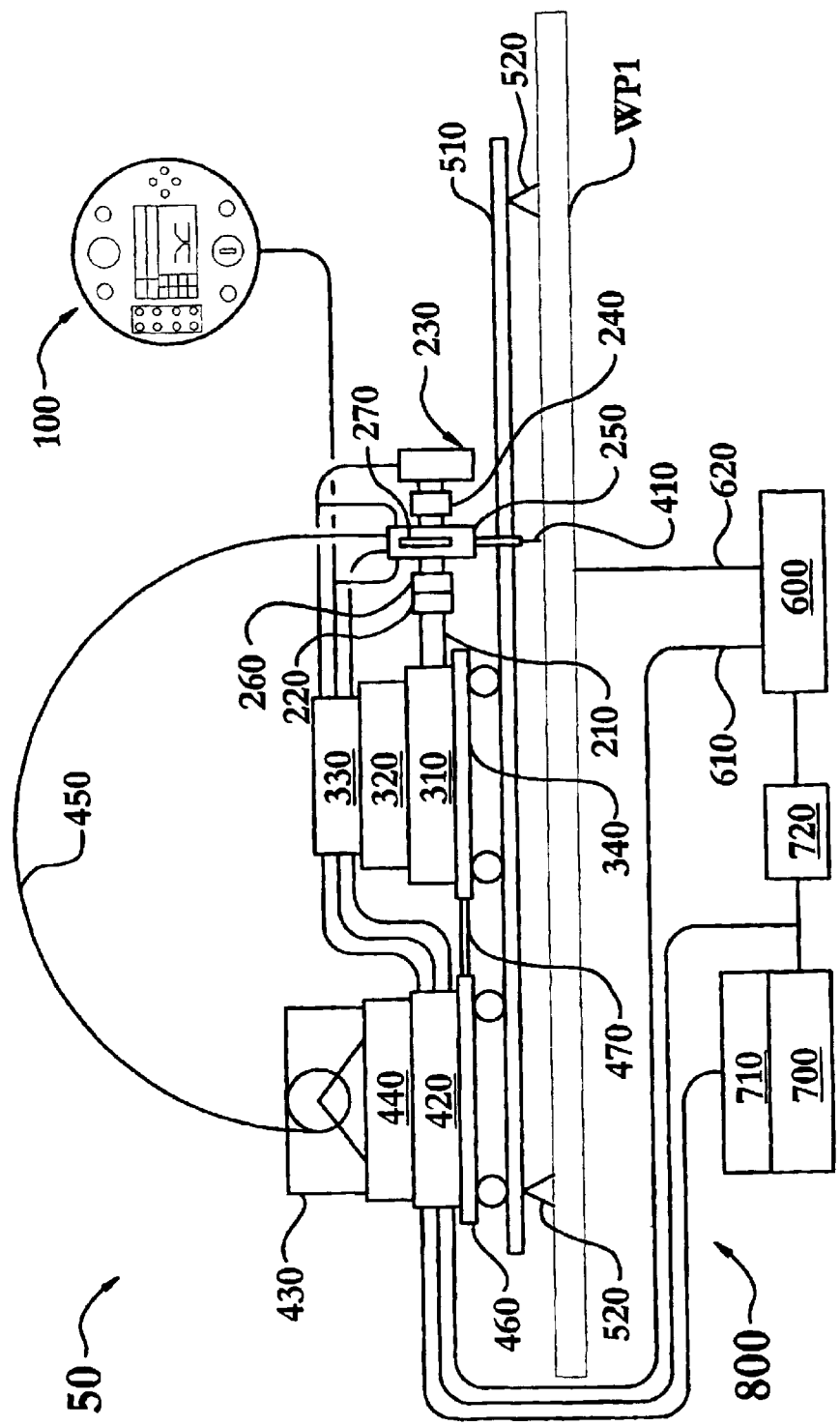
FIG. 2 shows a schematic of one embodiment of the present invention, not to scale.

The profiling and tracking means includes the joint profile and tracking system 230, also seen in FIG. 2. The joint profile and tracking system 230 serves to acquire information about a joint J where a plurality of work pieces intersect, illustrated best in FIG. 3. In one particular embodiment, the joint profile and tracking system 230 identifies the location of a first JE1 and a second joint edge JE2, as well as associated X, Y, and Z coordinates of a lower corner E1LC, E2LC and an upper corner E1UC, E2UC for each joint edge, as illustrated in FIG. 4, FIG. 5, and FIG. 6. The joint profile and tracking system 230 may further identify the center of the joint C, as well as the distance that the system 230 is away from a surface of one of the plurality of work pieces WP1, WP2. Such information may be acquired in any number of ways. One particular embodiment includes a laser sensor system 232 consisting of a laser 234 and a camera 236 in a single housing, as seen in FIG. 3. The laser 234 may include a semi-conductor laser and the camera 236 may be a complimentary metal oxide semiconductor (CMOS) type camera. In such an embodiment the joint information may be obtained utilizing laser-triangulation measurement.

In a typical configuration, the joint profile and tracking system 230 leads the welding torch 250 in the direction of travel by a predetermined lead distance LD, shown in FIG. 3. Therefore, the apparatus 50 is acquiring information about the upcoming section of the joint J. A joint profile and tracking system position adjuster 240, shown in FIG. 2, may be introduced to improve the flexibility with which the joint profile and tracking system 230 leads the welding means, or welding torch 250, thereby adjusting the lead distance LD. Various applications, and welding speeds, may require the joint profile and tracking system 230 to lead the welding means by varying lead distances LD.

The information acquired by the joint profiling and tracking system 230 allows the controlling means to have the welding means track along a joint J automatically. Further, the profiling and tracking system 230 acquires the data that permits the apparatus 50 to automatically change the size of a weld bead relative to changes in a weld layer to account for changes in the joint profile, as will be explained later in greater detail. One with skill in the art will appreciate that many other forms of joint profiling and tracking may be used. Further, the profiling and tracking means may incorporate off the shelf systems or may incorporate custom configured systems designed to minimize the size of the overall apparatus.

Referring again to FIG. 2, the welding torch 250 may also be attached to the beam 210. Most commonly, the welding torch 250 is attached through the rotation means, or pendulum 260. The pendulum 260, in association with the control system, acts to oscillate the torch 250 to obtain the desired weld bead size.

In addition to the joint profile and tracking system position adjuster 240, the adjusting means of the apparatus 50 generally also includes torch height adjuster 270. The height of the welding torch 250 above the work piece is critical to the success of the apparatus 50. The torch height may be predetermined, or it may be continuously variable as determined by the joint profile and tracking system 230. Additionally, the torch height adjuster 270 may be used to trim the length of the arc by moving the welding torch 250 in the Z-axis illustrated in FIG. 3.

Further, referring again to FIG. 2, the adjusting means may include a transverse beam adjuster 220. The transverse beam adjuster 220 may serve as to join the beam 210 to the welding tractor system 300 and to position the head assembly 200 transversely along the joint J, in the direction of the X-axis illustrated in FIG. 3. As with the other aspects of the adjusting means, the transverse beam adjuster 220 may be manual or fully automated. The transverse beam adjuster 220 is most commonly used to position the welding torch 250 and joint profile and tracking system 230 within a joint J. The beam 210 may be attached to the welding tractor system 300 through the transverse beam adjuster 220.

As one with skill in the art will appreciate, the welding means may include a flux-cored arc welding torch, a gas-metal arc welding torch, or a submerged arc welding torch. In one embodiment, a flux-cored arc welding torch 250 is utilized to receive a consumable electrode wire 410 and receive power from the power controlling means to create an arc, having predetermined characteristics, between the electrode wire 410 and the work pieces WP1, WP2. As the electrode wire 410 is continuously rolled out from the wire feed system 400 and into the weld zone, the welding arc is maintained by continuously melting the electrode wire 410 with the arc heat. The power controlling means generally consists of an electric welding power source 600 adapted to convert incoming alternating current constant voltage power to direct current variable voltage power for distribution to the welding torch 250. As illustrated in FIG. 2, a conductor 620 is attached from one of the plurality of work pieces WP1, WP2 to the negative output terminal of the welding power source 600. A conductor 610, or a plurality of conductors, generally electrically attaches the positive output terminal to the welding torch 250 such that an electrical arc can be initiated once the electrode wire 410 touches the surface of one of the plurality of work pieces WP1, WP2.

The moving means may incorporate a welding tractor system 300 as seen in FIG. 1. The moving means is adapted to cooperate with the longitudinal motion system 500 to ensure precise controlled motion of several components of the apparatus 50 along the joint J. In one of many potential embodiments, the longitudinal motion system 500 includes at least one rail 510 and at least one rail attachment 520, illustrated in FIG. 2. The at least one rail attachment 520 may include virtually any conventional attachment device, however, attachments that are easily attached and removed, such as vacuum pads, are often preferred. Similarly, the at least one rail 510 may incorporate any number of features to ensure accurate positioning of the elements that translate upon the rail 510. Generally, the at least one rail 510 is designed to cooperate with elements of the moving means, namely a welding tractor system 300, and the wire feeding means, namely a wire feed system 400.

One embodiment of the welding tractor system 300 includes a tractor system carriage 340 designed to cooperate with, and travel upon, the at least one rail 510. Similarly, one embodiment of the wire feeding means includes a wire feed system carriage 460 designed to cooperate with, and travel upon, the at least one rail 510. While in this particular embodiment the welding tractor system 300 and the wire feed system 400 are separate components, it is contemplated that these systems could be combined in a single component. The at least one rail 510 may include a toothed recess in which a pinion from the tractor system carriage 340 and/or the wire feed system carriage 460 cooperates so as to impart controlled unidirectional motion upon the welding tractor system 300 and the wire feed system 400. In yet another alternate embodiment, the tractor system carriage 340 may pull the wire feed system carriage 460 via a carriage inter-connector 470.

In one embodiment, the welding tractor system 300 may include a welding tractor 310, a motion drive 320, a tractor adaptor 330, and the previously described tractor system carriage 340. The welding tractor 310 and the motion drive 320 work together to accurately power the welding tractor system 300 along the longitudinal motion system 500. The tractor adaptor 330 may serve to demodulate and/or condition various control signals transmitted about the apparatus 50.

Still referring to FIG. 2, in one embodiment, the wire feed system 400 may include a wire spool 430, a wire feed adaptor 440, a wire feeder 420, and the previously described wire feed system carriage 460. The wire spool 430 houses and dispenses the electrode wire 410. The wire feed adaptor 440 may serve to demodulate and/or condition various control signals transmitted about the apparatus 50. Further, the wire feeder 420 may act to control the speed with which the electrode wire 410 is dispensed from the wire spool 430. As previously noted, the wire feed system 400 may be self-powered, or may simply be pulled by the welding tractor system 300 via the carriage inter-connector 470. In some embodiments, the electrode wire 410 may be fed from the wire spool 430 to the welding torch 250 within a wire feed cable 450. The wire feed cable 450 may also serve to electrically connect the wire feed system 400 and the welding torch 250. In fact some embodiments may utilize the wire feed cable 450 to transmit the welding power to the welding torch 250.

As one with skill in the art will appreciate, while the previous description of the various potential embodiments of the longitudinal motion system 500 are directed toward large scale applications wherein the longitudinal motion system 500 is attached to stationary work pieces WP1, WP2, the apparatus 50 of the present invention may incorporate a longitudinal motion system 500 wherein the work pieces WP1, WP2 are fed to the various elements of the apparatus 50.

The apparatus 50 also includes a portable means for user input and display, also referred to as a user interface pendent 100. The user interface pendent 100 is a durable lightweight device that may be carried by the user overseeing the operation of the apparatus 50. The user interface pendent 100 may be hardwired to communicate with the various components of the apparatus 50, or it may be wireless. The user interface pendent 100 may include a plurality of input and output devices adapted to control various aspects of the apparatus 50. Now referring to FIG. 4, one particular embodiment of the pendent 100 includes a synergic fill regulation device 110, a welding voltage regulation device 120, an emergency stop button 130, a system lock/unlock key device 140, a start device 150, a stop device 160, an input pad 170, a touch screen 180, and an axis adjustment device 190. The synergic fill regulation device 110 allows the user to influence the automatic welding of the apparatus 50 while it is welding, and will be described in greater detail below. Additionally, the welding voltage regulation device 120 permits the user to influence the automatic welding of the apparatus 50 during welding. In one embodiment, the welding voltage regulation device 120 is a resistance-based knob permitting the user to change the welding voltage by a predetermined amount to maintain a constant arc length during the welding process. A user may need to adjust the welding voltage to account for power transmission losses over long cables from the welding power source 600. In one preferred embodiment the user may utilize the welding voltage regulation device 120 to change the welding voltage by +/−2 volts.

The emergency stop button 130 allows a user to terminate all apparatus 50 activities in the case of an emergency. The system lock/unlock key device 140 restricts use of the apparatus to only those individuals having a cooperating key. The system lock/unlock key device 140 may be a mechanical device, but is preferably an electrical device. The start device 150 activates the welding process and the stop device 160 deactivates the welding process. The pendent 100 may include an input pad 170 to perform predetermined functions that are commonly used, or to quickly navigate to commonly used screens. The pendent 100 may additionally include at least one touch screen 180 to enter and display information. In one particular embodiment the touch screen 180 is occupied with an interface version of a popular operating system application. Further, the user may change the location of the welding torch 250 during operation with the axis adjustment device 190. Typically, the user will have programmed in predetermined axis and jog distances from the window shown on the touch screen 180 such that the user may make quick adjustments by simply depressing one of the buttons of the axis adjustment device 190.

The controlling means controls at least the welding means, the location adjusting means, the rotation means, the electrode means, the moving means, and the power controlling means based upon input from the profiling and tracking means and the user input and display means to obtain a weld of a predetermined base metal dilution. The controlling means may incorporate a number of predetermined welding modes. For example the controlling means may include an adaptive fill mode, a synergic fill mode, and a manual mode.

The controlling means includes in part at least one system controller 700. The at least one system controller may include any number of attached sub-controllers to communicate with various components of the apparatus 50. Sub-controllers are common when self-contained, or proprietary, components are introduced into the apparatus 50. Such sub-controllers may include a joint profile and tracking system controller 710 and a welding source adaptor 720. The welding source adaptor 720 may serve to demodulate and/or condition various control signals transmitted about the apparatus 50. Additionally, the system controller 700 may be configured to communicate with auxiliary input and display devices such as conventional monitors, keyboards, and mice.

Figure 8:
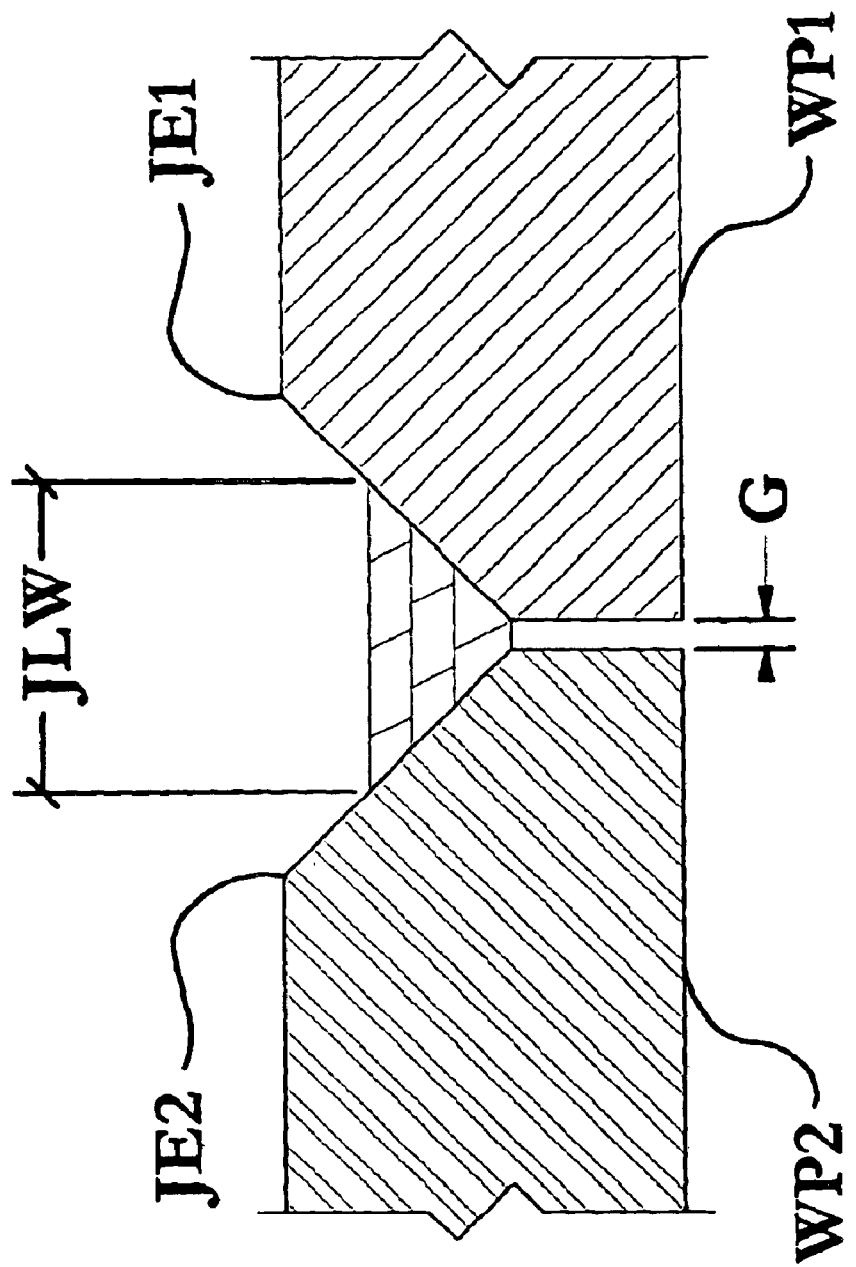
FIG. 8 shows a cross-sectional view, not to scale, of the joint of FIG. 5 taken along section line 6—6 with a portion of a multi-layer multi-pass weld shown therein.

When operating in the adaptive fill mode, the apparatus 50 may adaptively change the predetermined weld bead size, with no external intervention, to compensate for changes in a weld joint layer width JLW, seen in FIG. 8, to account for changes in the joint profile. Joint fit-up problems are commonly encountered when joining multiple work pieces. Just one of many fit-up problems is illustrated in FIG. 5, FIG. 6, and FIG. 7, wherein the gap between the first work piece WP1 and the second work piece WP2 is variable throughout the length of the joint J. Therefore, if the joint J shown in FIG. 6 and FIG. 7 is to be filled with five layers of welds, the apparatus 50 must be capable of sensing the increase in layer width and making adjustments to the weld bead size to ensure that the particular number of weld passes completely fills the layer, while not reducing the quality of the weld.

The controlling means accomplishes this in a new and novel method implemented in a new and novel apparatus. The apparatus 50 carries out this method with new and novel software. In one particular embodiment this new and novel method is implemented by system software 900 having a plurality of modules, shown in FIG. 9. One with skill in the art will appreciate that this is just one illustrative embodiment, and that many alternative software architectures may be utilized to incorporate the method of the present invention. This embodiment includes the following modules; process database 910, motion 920, welding 930, tracking 940, synergic and adaptive fill 950, profile sensing 960, user interface 970, communication 980, and data exchange 990. These modules are integrated together based on the system requirements of initialization, configuration, setup, jog, dry run, and welding.

The process database module 910 of the present embodiment hosts all of the information necessary to implement the targeted welding process. This information may not only be used for welding, but may also be utilized for welding documentation purposes, as is often required in many industries.

The motion module 920 of the present embodiment implements the required control of the four axes, illustrated in FIG. 3, of the present embodiment, namely the longitudinal axis (X-direction), the transverse axis (Y-direction), the torch height axis (Z-direction), and the torch trajectory oscillation plane (P-direction). A sub-module for each axis controls speed regulation, change in direction, positioning, move enable/disable, and coordination system selection.

Further, an oscillation algorithm controls the oscillator's oscillation parameters including a left dwell time, a right dwell time, and a frequency.

The welding module 930 of the present embodiment includes an enable/disable sub-control module for the welding power source 600, the wire feed system 400, and a gas solenoid valve, for use when utilizing shielding gas. These enable/disable controls are accomplished using industrial I/O signals. The welding module 930 also incorporates at least one analog sub-control module for regulation of the welding voltage and the wire feed speed. The welding module 930 may also allow the user to select from different arc welding processes, power sources, welding parameters, wire feeders, and additional welding information. Even further, the software may allow the user to select single or double side welding. The welding module 930 also provides programmable, time-based control of welding parameters for start and stop sequences, such as welding voltage, wire feed speed, and gas flow rate. For example, the stop sequence may ramp down the welding parameters on a time basis to fill a traditional end of the line crater up to the expected weld bead level.

The tracking module 940 of the present embodiment is responsible for making the position adjustment to the welding torch 250 based upon joint profile information captured by the joint profile and tracking system 230. The module 940 performs its function by first obtaining an enabled tracking command set and storing the x and y coordinates of a previewed tracking point in a ring-like buffer in a feed forward manner. This permits the welding torch 250 to be positioned based upon what the joint profile and tracking system 230 saw when it was at the position where the welding torch 250 is currently located. The number of the buffer allocated is equal to the number of small segments between the welding torch 250 and the joint profile and tracking system 230 wherein joint profile data is to be collected. The number of the buffer allocated equals the total number of small segments that will be profiled. Depending on the speed of the welding torch 250, the lead distance LD is generally divided into between approximately five and approximately eighty segments.

The synergic and adaptive fill module 950 of the present embodiment allows the user to select a synergic fill number as a base number prior to welding, and to enable/disable synergic or adaptive fill welding operations. The synergic fill number represents a ratio of the predetermined wire feed speed to the predetermined travel speed. Therefore, the synergic fill number represents the size of a weld bead and in this module 950 acts as an index to an array of grouped optimized welding parameters that are based upon experimental data.

Now departing from the description of the system software modules, the experimental data is collected using a systematic parameter development method, invented by the present inventors, that develops relationships between the arc length, productivity, and quality for a given application (i.e., fixed weld size). The systematic parameter development method controls the weld deposit size by fixing the wire feed speed to travel speed ratio. A series of constant deposit area welds are then made at different arc lengths to window the process capability. High-speed data acquisition is used to capture the voltage and current waveform and calculate the power and heat input.

Process functional relationships are then determined by plotting voltage versus current, voltage versus wire feed speed, current versus wire feed speed, and heat input versus productivity, or deposition rate. Base metal dilution between the deposit and the base material is then used to assess fusion quality. Experimentation has shown that base metal dilution in the range of approximately 30% to approximately 70% resulted in welds of high quality. Higher base metal dilution can promote higher quality welds but may limit the process capability for out-of-position welding. Therefore, in one exemplary embodiment the optimized welding parameters were experimentally acquired having a goal of obtaining a base metal dilution between approximately 40% and approximately 50%. The range of base metal dilution used to acquire the experimentally optimized parameters may be customized for each particular application.

In the present embodiment, arrays of grouped optimized welding parameters exist for a plurality of welding pass categories, namely a root pass, a fill pass, and a cap pass, (named for their deposited layer positions in the joint) and a plurality of synergic fill numbers. The optimized welding parameters include a predetermined wire feed speed, a predetermined travel speed, a welding voltage, a welding current, an oscillation width, at least one dwell time for the welding means, and a plurality of bead size parameters. The plurality of bead size parameters may include a bead width, a bead depth, at least one leg length, and at least one leg toe angle. Prior adaptive welding methods have lacked the ability to ensure weld quality in part because they generally focus on only varying one of the wire feed speed, the voltage, or the travel speed. The present invention systematically varies the voltage, the wire feed speed, and the travel speed based upon the process relationships that result in a predetermined base metal dilution and weld bead shape.

While the adaptive fill mode is fully automated and does not permit user influence, the synergic fill mode permits the user to influence the welding operation during welding. Referring again to FIG. 4, the synergic fill regulation device 110, on the pendent 100, allows the user to influence the automatic welding of the apparatus 50. More specifically, the synergic fill regulation device 110 permits the user to change the synergic fill number. Consequently, the size of the weld bead may be systematically set and varied with the application of different synergic fill numbers. Therefore, the concept of changing the synergic fill number and thereby changing a plurality of optimized parameters, herein referred to as synergic fill welding, not only maximizes the use of optimized welding parameters but also avoids the manual individual adjustments of a multitude of welding parameters by a user to vary the size of the weld bead having no control on the weld quality. In one particular embodiment the synergic fill regulation device 110 is a simple position-based digital control knob, however one with skill in the art will appreciate that it may be essentially any electronic input device. Additionally, a manual mode provides the operator the option of controlling all of the welding parameters from the single location of the user interface pendent. This option of single point manual control provides the operator with great flexibility and convenience.

Figure 9:
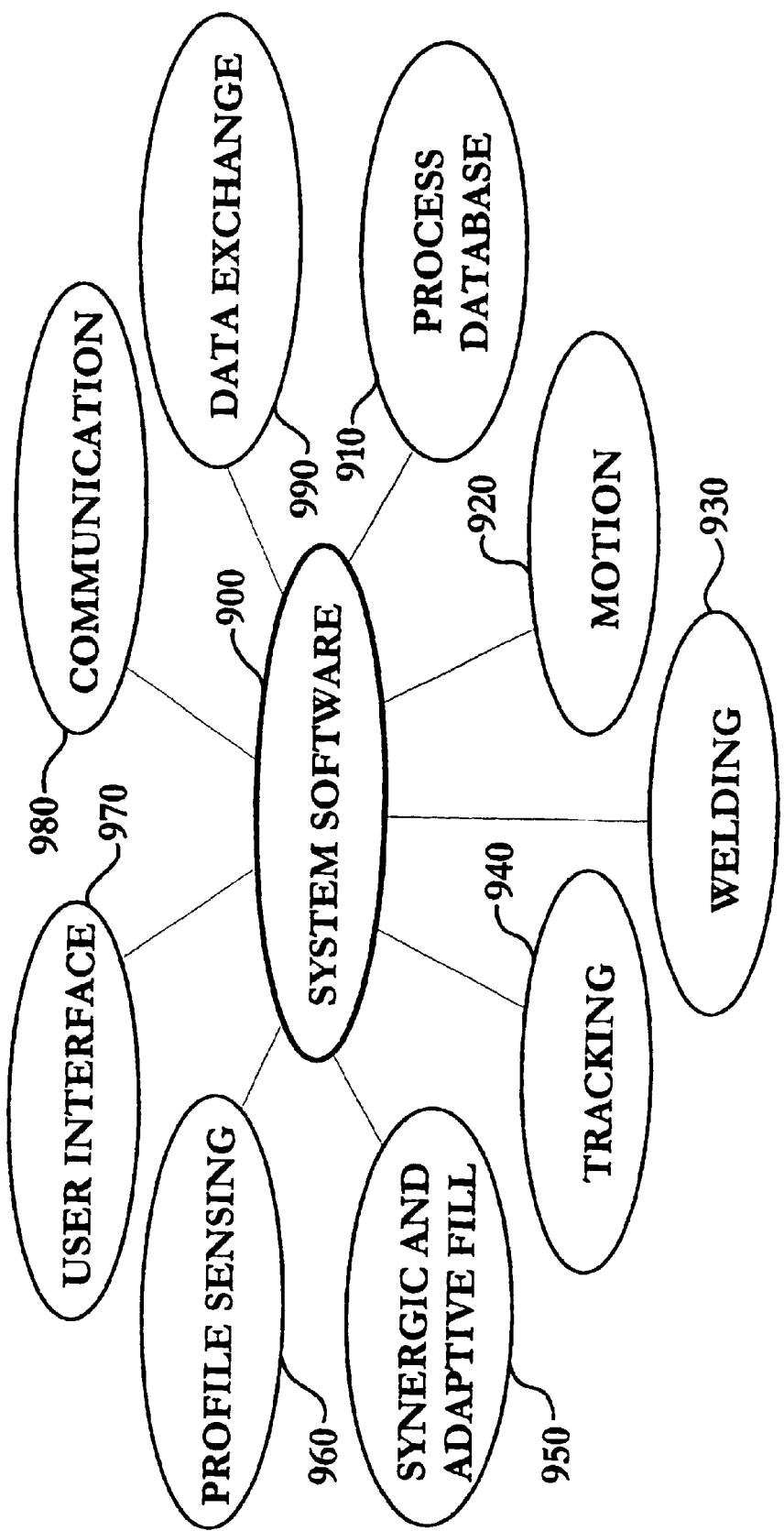
FIG. 9 shows a schematic of a portion of the present invention.

Now, referring back to the various software modules illustrated in FIG. 9, the joint profile module 960 of the instant embodiment constantly communicates with the base system software 900 residing in the joint profile and tracking system 230 via an RS-422 serial port to exchange data and commands. In this particular embodiment the base software is responsible for setting up specific joint characteristics such as the joint type, base metal preparations, and certain sensor characteristics such as image acquisition rate. One with skill in the art will appreciate that this module 960, and for that matter any module herein, may reside virtually anywhere in the apparatus 50, and is not limited to residing in the joint profile and tracking system 230. This module 960 accesses the joint profile and tracking system 230 to gather and process information about the joint geometry, derive tracking data, calculate the area and area change of an unfilled joint groove, and turn the joint profile and tracking system 230 on and off. This module 960 also accepts position data of the welding torch 250 as input.

The user interface module 970 of the instant embodiment may be embedded to the user interface pendent 110 for interacting with the user via any of the user interface devices. Further, the module 970 may translate and dispatch commands issued by the user via an RS-422 serial port after analysis of the status of the various user interface devices of the pendent 110. Still further, the module 970 may perform background processing of information received from the system controller 700.

The communication module 980 of the instant embodiment is implemented between the system controller 700 and the pendent 110, and between the system controller 700 and the joint profile and tracking system 230 controller via two RS-422 serial ports in order to achieve fast and reliable data exchange. The communication of the system software with the pendent 110 is activated by channel build-up software, which is developed using multithreads approach to meet the requirement of random talking. A self-defined command set consisting of different instructions is integrated into the different operational modes, which forms a communication protocol between the pendent 110 and the system controller 700. Additionally, embedded dynamic link libraries that reside in the system controller 700 are used for the communication between the system controller 700 and the joint profile and tracking system 230.

The data exchange module 990 of the instant invention responds to the command set issued from the pendent 100, forwards the joint profile data from the joint profile and tracking system 230 to the pendent 100, feeds back the torch position data to the joint profile and tracking system controller, and applies the synergic and adaptive fill strategy. Two time-stamped data structures are designed according to the requirement of the system architecture. The first data structure is for saving the current torch position and the user selected synergic fill number, and the second data structure is for storing the recommended synergic fill number and the demanded torch position from the joint profile and tracking system controller 710.

Figure 10:
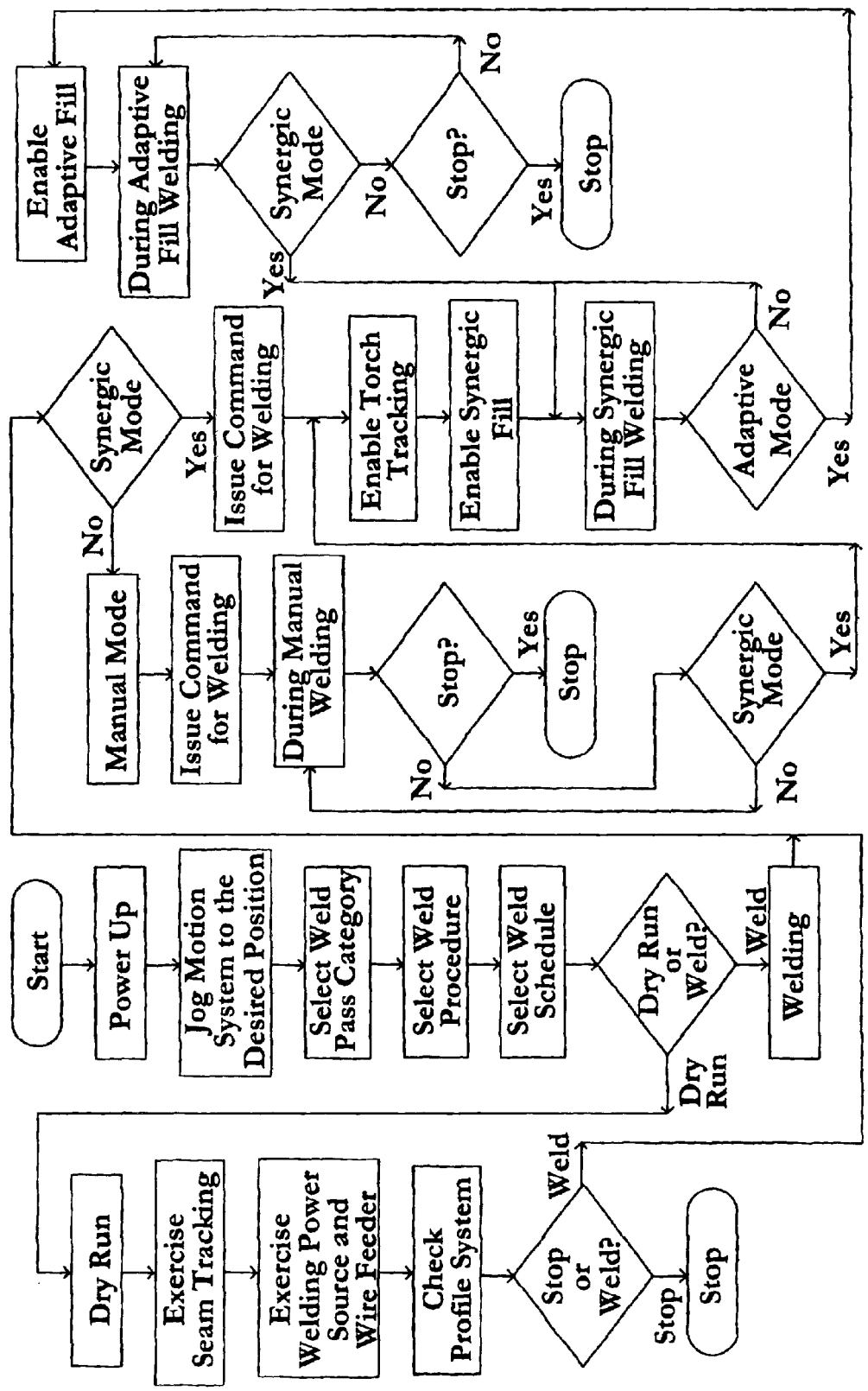
FIG. 10 shows a flowchart of the execution sequence of one embodiment of the present invention.

Further, the system software 900 of the instant embodiment embodies a coordination module that manages the events occurring inside the system. This module ranks the priorities of the requested actions, routes the command set to dedicated command handlers for execution, and monitors and processes the requests originated from the pendent 100 and the joint profile and tracking system controller 710. The execution sequence of one embodiment of the present invention is illustrated in FIG. 10.

Lastly, the apparatus 50 includes a means for communicating a plurality of input and output commands, and power among the various means of this apparatus 50, illustrated as a power/communication system 800 in FIG. 1 and FIG. 2. As previously described, the input and output commands, as well as other monitoring data, may be transmitted via RS-422 serial ports to achieve fast and reliable data exchange. Further, all signals may be noise immunized. Additionally, signal transmission may incorporate a modulation/demodulation technology whereby analog speed signals of the voltage type are converted into proportional frequency signals at the system controller 700 side, and then are converted back into proportional analog signals at the end devices. Alternatively, wireless data transfer methods are contemplated. Power may be transmitted within the apparatus utilizing standard power transmission conductors.

Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute, and/or additional or alternative materials, relative arrangement of elements, and dimensional configurations. Accordingly, even though only a few variations of the present invention are described herein, it is to be understood that the practice of such additional modifications and variations and the equivalents thereof, are within the spirit and scope of the invention as defined in the following claims. The corresponding structures, materials, acts, and equivalents of all means or step plus function elements in the claims below are intended to include any structure, material, or acts for performing the functions in combination with other claimed elements as specifically claimed.

We claim:

1. An adaptive and synergic fill welding apparatus for joining at least a first work piece and a second work piece along a joint having a variable joint profile, comprising:
   a means for profiling and tracking the joint;
   a means for welding the joint by creating an electrical arc between a tip of a consumable electrode and the first or second work piece thereby melting the electrode and producing a weld bead at a predetermined weld bead size;
   a means for feeding the consumable electrode to the welding means at a predetermined wire feed speed;
   a means for controlling the power necessary to create the electrical arc;
   a means for adjusting the location of the profiling and tracking means and the welding means;
   a means for adjusting the rotation of the welding means;
   a means for moving the profiling and tracking means, the welding means, the location adjusting means, the rotation adjusting means, and the electrode feed means, along the joint at a predetermined travel speed;
   a portable means for user input and display;
   a means for controlling the welding means, the location adjusting means, the rotation adjusting means, the electrode feed means, the moving means, and the power controlling means based upon input from the profiling and tracking means and the user input and display means to obtain a predetermined base metal dilution; and
   a means for communicating a plurality of input and output commands, and power among the various means of this apparatus.

2. The apparatus of claim 1, wherein the control means includes an adaptive fill mode wherein the predetermined weld bead size is adaptively modified, with no external intervention, relative to changes in a layer width to account for changes in the joint profile.

3. The apparatus of claim 1, wherein the user input and display device includes a manual synergic fill regulation device for the user to externally influence the weld bead size to account for changes in the joint profile.

4. The apparatus of claim 3, wherein the control means includes a synergic fill mode wherein the synergic fill regulation device is adapted to change a synergic fill number, representing a ratio of the predetermined wire feed speed to the predetermined travel speed during welding, thereby changing the predetermined weld bead size.

5. The apparatus of claim 4, wherein the control means references a plurality of electronic arrays, stored in at least one memory device, containing a plurality of optimized welding parameters, selected to obtain the predetermined base metal dilution, for a plurality of welding pass categories and a plurality of synergic fill numbers.

6. The apparatus of claim 5, wherein the predetermined base metal dilution is between approximately 30% and approximately 70%.

7. The apparatus of claim 5, wherein the predetermined base metal dilution is between approximately 40% and approximately 50%.

8. The apparatus of claim 5, wherein the plurality of welding pass categories includes a root pass, a fill pass, and a cap pass.

9. The apparatus of claim 5, wherein the plurality of optimized welding parameters include the predetermined wire feed speed, the predetermined travel speed, a welding voltage, a welding current, an oscillation width of the welding means, at least one dwell time for the welding means, and a plurality of bead size parameters.

10. The apparatus of claim 9, wherein the plurality of bead size parameters includes a bead width, a bead depth, at least one leg length, and at least one leg toe angle.

11. The apparatus of claim 1, wherein the input and display means includes a manual welding voltage regulation device for a user to externally influence a voltage of the electrical arc to account for power transmission losses between the welding means and the power controlling means.

12. The apparatus of claim 1, wherein the input and display means includes a manual axis adjustment device for a user to externally influence the location adjusting means and the rotation adjusting means, thereby adjusting the position of the welding means during welding, including adjustment of the welding means along a longitudinal axis, a transverse axis, an orthogonal axis, and a torch trajectory plane.

13. The apparatus of claim 1, wherein the profiling means includes a laser sensor system.

14. The apparatus of claim 13, wherein the laser sensor system includes at least one laser and at least one camera.

15. The apparatus of claim 13, wherein the laser sensor system utilizes laser triangulation to obtain a plurality of joint profile data.

16. The apparatus of claim 1, wherein the welding means is selected from the group consisting of a flux-cored arc welding torch, a gas-metal arc welding torch, and a submerged arc welding process.

17. The apparatus of claim 1, wherein the moving means includes at least one carriage and at least one cooperating rail attached to the first or second work piece.

18. An adaptive and synergic fill welding apparatus for joining at least a first work piece and a second work piece along a joint having a variable joint profile, comprising:
   a means for profiling and tracking the joint;
   a means for welding the joint by creating an electrical arc between a tip of a consumable electrode and the first or second work piece thereby melting the electrode and producing a weld bead at a predetermined weld bead size;

a means for feeding the consumable electrode to the welding means at a predetermined wire feed speed;

a means for controlling the power necessary to create the electrical arc;

a means for adjusting the location of the profiling and tracking means and the welding means;

a means for adjusting the rotation of the welding means;

a means for moving the profiling and tracking means, the welding means, the location adjusting means, the rotation adjusting means, and the electrode feed means, along the joint at a predetermined travel speed;

a portable means for user input and display having a manual synergic fill regulation device for the user to externally influence the weld bead size to account for changes in the joint profile;

a means for controlling the welding means, the location adjusting means, the rotation adjusting means, the electrode feed means, the moving means, and the power controlling means based upon input from the profiling and tracking means and the user input and display means to obtain a predetermined base metal dilution, wherein the control means includes a synergic fill mode wherein the synergic fill regulation device is adapted to change a synergic fill number, representing a ratio of the predetermined wire feed speed to the predetermined travel speed during welding, thereby changing the predetermined weld bead size, and the control means references a plurality of electronic arrays, stored in at least one memory device, containing a plurality of optimized welding parameters, selected to obtain the predetermined base metal dilution, for a plurality of welding pass categories and a plurality of synergic fill numbers; and a means for communicating a plurality of input and output commands, and power among the various means of this apparatus.

19. The apparatus of claim 18, wherein the control means includes an adaptive fill mode wherein the predetermined weld bead size is adaptively modified, with no external intervention, relative to changes in a layer width to account for changes in the joint profile.

20. The apparatus of claim 18, wherein the predetermined base metal dilution is between approximately 30% and approximately 70%.

21. The apparatus of claim 18, wherein the predetermined base metal dilution is between approximately 40% and approximately 50%.

22. The apparatus of claim 18, wherein the plurality of welding pass categories includes a root pass, a fill pass, and a cap pass.

23. The apparatus of claim 18, wherein the plurality of optimized welding parameters include the predetermined wire feed speed, the predetermined travel speed, a welding voltage, a welding current, an oscillation width of the welding means, at least one dwell time for the welding means, and a plurality of bead size parameters.

24. The apparatus of claim 23, wherein the plurality of bead size parameters includes a bead width, a bead depth, at least one leg length, and at least one leg toe angle.

25. The apparatus of claim 18, wherein the input and display means includes a manual welding voltage regulation device for a user to externally influence a voltage of the electrical arc to account for power transmission losses between the welding means and the power controlling means.

26. The apparatus of claim 18, wherein the profiling means includes a laser sensor system.

27. The apparatus of claim 26, wherein the laser sensor system includes at least one laser and at least one camera.

28. The apparatus of claim 27, wherein the laser sensor system utilizes laser triangulation to obtain a plurality of joint profile data.

29. An adaptive and synergic fill welding apparatus for joining at least a first work piece and a second work piece along a joint having a variable joint profile, comprising:

a laser based means for profiling and tracking the joint having at least one laser and at least one camera working in conjunction utilizing laser triangulation to obtain a plurality of joint profile data;

a means for welding the joint by creating an electrical arc between a tip of a consumable electrode and the first or second work piece thereby melting the electrode and producing a weld bead at a predetermined weld bead size;

a means for feeding the consumable electrode to the welding means at a predetermined wire feed speed;

a means for controlling the power necessary to create the electrical arc;

a means for adjusting the location of the profiling and tracking means and the welding means;

a means for adjusting the rotation of the welding means;

a means for moving the profiling and tracking means, the welding means, the location adjusting means, the rotation adjusting means, and the electrode feed means, along the joint at a predetermined travel speed;

a portable means for user input and display having a manual synergic fill regulation device for the user to externally influence the weld bead size to account for changes in the joint profile;

a means for controlling the welding means, the location adjusting means, the rotation adjusting means, the electrode feed means, the moving means, and the power controlling means based upon input from the profiling and tracking means and the user input and display means to obtain a predetermined base metal dilution, wherein the control means includes a synergic fill mode wherein the synergic fill regulation device is adapted to change a synergic fill number, representing a ratio of the predetermined wire feed speed to the predetermined travel speed during welding, thereby changing the predetermined weld bead size, and the control means references a plurality of electronic arrays, stored in at least one memory device, containing a plurality of optimized welding parameters including the predetermined wire feed speed, the predetermined travel speed, a welding voltage, a welding current, an oscillation width of the welding means, at least one dwell time for the welding means, and a plurality of bead size parameters, selected to obtain the predetermined base metal dilution between approximately 30% and 70%, for a plurality of welding pass categories and a plurality of synergic fill numbers; and a means for communicating a plurality of input and output commands, and power among the various means of this apparatus.

30. The apparatus of claim 29, wherein the predetermined base metal dilution is constant over an entire length of the weld.

* * * * *